United States Patent [19]

Heilweil et al.

[11] Patent Number: 4,652,375
[45] Date of Patent: Mar. 24, 1987

[54] PROCESS FOR SELECTIVELY EXTRACTING DISSOLVED SALTS FROM AQUEOUS MEDIA

[75] Inventors: Israel J. Heilweil, Princeton, N.J.; Tsoung Y. Yan, Philadelphia, Pa.

[73] Assignee: Mobil Oil Corporation, New York, N.Y.

[21] Appl. No.: 831,099

[22] Filed: Feb. 18, 1986

Related U.S. Application Data

[63] Continuation of Ser. No. 584,294, Mar. 1, 1984, abandoned, which is a continuation of Ser. No. 352,915, Feb. 26, 1982, abandoned, which is a continuation-in-part of Ser. No. 196,960, Oct. 14, 1980, abandoned.

[51] Int. Cl.$^4$ ............................................. B01D 11/04
[52] U.S. Cl. ................................... 210/642; 423/157; 423/181
[58] Field of Search .............. 210/634, 638, 642, 643, 210/774, 737, 775; 23/303, 307; 423/157, 181, 499, DIG. 14; 8/141, 142

[56] References Cited

U.S. PATENT DOCUMENTS

| | | | |
|---|---|---|---|
| 3,105,740 | 10/1963 | George | 423/181 |
| 3,135,501 | 6/1964 | Dahms | 423/181 |
| 3,219,422 | 11/1965 | Ellis | 210/634 |
| 3,450,508 | 6/1969 | Cooper | 423/181 |
| 3,490,880 | 1/1970 | Charlesworth | 23/203 |
| 3,779,907 | 12/1973 | Li | 210/638 |
| 4,002,562 | 1/1977 | Ames | 210/774 |

OTHER PUBLICATIONS

Aebi, C. M. et al., "Solubility of Sodium Chloride in Organic Solvents," Journal of Colloid Science, vol. 13, pp. 161–167, 1959.

Roberts, F. et al., "Horizontal Mixer-Settler . . . ", Trans. Instn., Chem. Engrs., vol. 35, 1957, pp. 6–20.

*Primary Examiner*—Ernest G. Therkorn
*Attorney, Agent, or Firm*—A. J. McKillop; M. G. Gilman; L. P. Hobbes

[57] ABSTRACT

A process is provided wherein dissolved salts are selectively extracted from aqueous saline media by contacting the aqueous media with a solvent comprising a water insoluble organic diluent such as kerosene and a surfactant capable of effecting a preferntial transfer of solubilized salts in the aqueous media into the non-aqueous phase.

13 Claims, No Drawings

PROCESS FOR SELECTIVELY EXTRACTING DISSOLVED SALTS FROM AQUEOUS MEDIA

This is a continuation of application Ser. No. 584,294, filed on Mar. 1, 1984, which in turn is a continuation of application Ser. No. 352,915 filed on Feb. 26, 1982, which in turn is a continuation-in-part of application Ser. No. 196,960, filed Oct. 14, 1980, all now abandoned.

BACKGROUND OF THE INVENTION

1. Field of the Invention

The present invention relates to the purification of saline solutions and, more particularly, to an improved process for selectively extracting salts from aqueous media such as sea water, industrial streams, ground waters and the like.

2. Brief Description of the Prior Art

As known, prior artisans have throughout history considered saline waters, such as the vast oceans, as a potential or source for the ever-increasing demand for fresh water. In recent years, the actual necessity for recovering demineralized water from salt containing aqueous media, such as sea water or certain industrial streams, has become increasingly significant both from a standpoint of obtaining fresh water for human consumption and/or providing purified waters for ecology purposes.

To a large extent, the somewhat extensive research efforts in this area have been directed to three basic desalination processes. These are: distillation, electrodialysis and freezing. Distillation techniques typically involve multistage or effect procedures wherein preheated sea water is introduced into a series of stages with the water being flashed into steam or vapor and utimately recovered as pure water. In electrodialysis, a large chamber is divided into compartments by thin sheets called membranes. Two alternately positioned types of membranes are employed. One allows positive ions to pass while the other lets only negative ions through. When an electric current is sent through the water, the negative ions are drawn through the membranes permeable to the negative ions toward the positive electrode. Likewise, the positive ions are drawn through the membrane permeable to positive ions toward the negative electrodes. Freezing techniques are based on the fact that when sea or salt water freezes, the ice crystals that are produced are pure water in solid form. Thus, the salt that is separated and trapped between the ice crystals, may be removed by washing with fresh water with the ice then being melted to obtain free water. A further and perhaps more recent technique involves liquid extraction wherein solvents capable of "extracting" the water and rejecting the salts, are used in otherwise conventional liquid-liquid extraction procedures. Specific examples of such solvents include 2-ethylhexylamine, methyl benzyl amine and phenyl ethanol amine.

While the above procedures are known and have achieved, at least to some extent, commercial significance, in general they suffer from certain disadvantages and/or difficulties. For example, they often require large amounts of energy as well as large capital expenditures. Further, such known techniques are sometimes very complex and require elaborate processing operations. Known extraction processes are also often complex and generally less than effective since the extracted water must, in turn, be recovered from the solvent. The present invention is directed to an advanced in the art relative to the removal of salts from aqueous saline solutions.

SUMMARY OF THE INVENTION

In summary, the present invention is directed to a selective extraction process for removing salts from aqueous media or solutions such as sea water, brackish water, industrial streams, and the like. While a principal objective of the invention is to provide a highly efficient process to effect desalination of sea water or the like, a further objective is to provide a process for removing salts from aqueous dispersions which contain additional impurities or substances such as calcite, gypsum, iron oxides, etc., which interfere with conventional desalination techniques. In its broadest aspects, in accordance with the process of the invention, salts and other impurities are removed by the selective extraction with a solvent comprising a surfactant capable of colloidally dispersing concentrated aqueous salt solutions and a water insoluble diluent, such as kerosene, which is effective to facilitate phase formation.

In the practice of the invention, and again broadly speaking for the moment, the fresh water is recovered as a bottom or heavy phase, i.e., the raffinate, with the extract or lighter phase comprising the concentrated salt solution and solvent. The concentrated dispersion of the salt solution is thereafter separated from the solvent in a manner to be discussed hereinbelow with the recovered solvent being recycled to the process. The process of the invention may be carried out in single or multi-stage extractors and in accordance with known techniques. As aforesaid, the unique process of the invention is not subject to the disadvantages of known desalination techniques and provides a particularly advantageous process for removing salts from aqueous media.

It is accordingly a general object of the present invention to provide a process for reducing the salt concentration of sea water and other salt-containing aqueous media.

A further and more particular object is to provide a highly effective and improved process for extracting salt from sea water, brackish waters and the like and to obtain potable water, waters with a reduced salt content or purified waters for process or other applications.

Another object is to provide a process for extracting dissolved salts from aqueous solutions or streams.

A still further object is to provide a process for removing salt from an aqueous solution containing additional impurities such as calcite, gypsum, iron oxide and the like.

Another object is to provide a process for significantly reducing the dissolved salt and other impurity content of barren solutions employed in industrial process operations, such as in the in situ leaching of uranium or other ores and minerals.

The manner in which the foregoing and further objects are achieved in accordance with the present invention will be better understood in view of the following detailed description.

DESCRIPTION OF SPECIFIC EMBODIMENTS

The present invention relates to a process for selectively extracting salts from aqueous solutions or feed streams which comprises contacting the salt containing solution with an organic solvent composed of a water-insoluble organic diluent and a surfactant which serves to effect a preferential transfer of solubilized salts in the aqueous phase into the non-aqueous phase. The aqueous feedstock and solvent are maintained under liquid-liquid extraction conditions for a period of time to form two immiscible phases including a heavy, solute-free water phase, i.e., the raffinate, and a lighter extract phase comprising predominantly a concentrated salt solution dispersed within the solvent. The two immiscible phases are separated and recovered with the extract phase being subjected to further treatment to separate the salts from the solvent. As to the latter, it has been discovered that the concentrated salt solution may be very effectively and uniquely separated from the solvent by increasing the temperature of the salt/solvent dispersion, i.e., the extract, on the order of from between about 10° to 30° C.; this temperature increase resulting in a phase inversion and separation of the salt from the solvent. In accordance with a further process embodiment, the separation of the salts from the solvent may be effected and/or enhanced by the addition of secondary diluents, such as low molecular weight alcohols, lighter hydrocarbons, etc. In either embodiment, the concentrated salts form a heavy layer or phase which settles and thus may be removed and discarded. The solvent is recycled for reuse in the extraction step.

At this point it may be noted that a particularly unique aspect of the invention lies in the fact that while the aqueous salt phase (i.e., the feedstock) may contain only water soluble species and the non-aqueous phase only nonaqueous soluble species, the contact between the phases results in a preferential transfer of the water soluble surfactants and solubilized salts in the aqueous phase into the non-aqueous phase. Further, and as will be appreciated by those skilled in the art, the process of the invention may be used to extract any aqueous saline feedstock, such as sea water, to obtain potable water, water with less dissolved salts, pure water for process operations, etc. The recovery of "fresh" water from brackish water or sea water is particularly suitable for use in industrial applications, for irrigation, for drinking water, etc. The process of the instant invention is also particularly advantageous for use in treating industrial process streams which contain, in addition to soluble salts, further impurities. For example, in the uranium in situ leaching process, dissolved salts have to be removed from the barren solution (used to extract the metal from the ore) to control the salt content of the leaching circuit and from the produced water in the restoration phase of the process for recycle to facilitate the restoration operation. These waters contain calcite, gypsum, iron oxides and other compounds which render conventional desalination techniques, such as electrodialysis, inoperative. Other industrial leaching and/or in situ mining operations involve similar difficulties. The present invention provides a remarkable solution to this long felt need.

Turning now to more specific details of the invention, the selective solvent to be employed herein preferably comprises from between about 3 to 15% by weight surfactant and from 85 to 97% by weight of the organic water insoluble diluent. Preferred diluents include kerosene, gasolines, light naphthas, low molecular weight hydrocarbons including paraffins and olefins, alcohols having carbon numbers greater than three, ketones, ethers, cuts of refinery process streams, i.e., FCC gasoline, and the like. Halogenated derivatives of such compounds may also be employed.

While the surfactant may be selected from a wide range of known surface active materials which are capable of lowering the tension at the surface of contact between the phases and which are capable of colloidally dispersing concentrated aqueous salt solutions, particularly advantageous and preferred surfactants include:

1. Surfactants which, in aqueous salt environments, become oil soluble upon addition of multivalent ions, such as Ca, Mg, Fe and the like. Examples of surfactants in this category are surfactants of the class $R(OCH_2CH_2)_nSO_4X$ and their sulfonate equivalents wherein R is selected from the group consisting of alkyl, alkylaromatic or aromatic radicals and X is a cation. The non-aqueous phase surfactants are also supplied in the form of oil-soluble and water-insouble derivatives, as, e.g., $C_{18}H_{37}(OCH_2CH_2)_{0-2}SO_4Ca_{\frac{1}{2}}$.

2. Surfactants which form micelles in both aqueous salt solutions and non-aqueous media, as exemplified by dioctyl sulfo succinate (Aerosol OT), lecithin, their derivatives, etc. These materials are well known in the art and are typically and widely employed as dry cleaning agents.

3. Multicomponent surfactant systems comprising an anionic surfactant, such as an organic sulfate or sulfonate of the alkyl or alkyl aryl type, and a cosurfactant selected from one or more of the following:

a. A non-ionic surfactant such as an ethoxylated aliphatic or an ethoxylated alkylaromatic compound, and their thiol derivatives exemplified by

$$RO(CH_2OCH_2)_nH$$

where R is an alkyl or aryl containing 6 to 30 carbons and n=1 to 20. Here is included ($CH_2OCH_2$) and its derivatives, and where O may be subsituted by S.

b. An alkyl or alkyary polyethoxy sulfate or sulfonate of the structure exemplified by

$$RO(CH_2OCH_2)_nSO_3M$$

$$RO(CH_2OCH_2)_nSO_4M$$

$$RO(CH_2OCH_2)_n(CH_2)_{n'}SO_3M$$

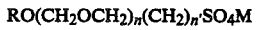
$$RO(CH_2OCH_2)_n(CH_2)_{n'}SO_4M$$

where R is an alkyl, or aryl containing 6 to 30 carbons and n=1 to 20, M is $Na_2$, K, $Ca_{\frac{1}{2}}$, $Mg_{\frac{1}{2}}$, and the like; and n' contains 1 to 6 carbons.

4. Surfactants of the betaine, sulfo-betaine type, exemplified by structural formulas:

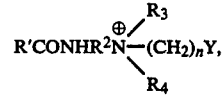
$$R'CONHR^2\overset{\oplus}{N}{\overset{\diagup R_3}{\underset{\diagdown R_4}{-}}}(CH_2)_nY,$$

Where R' is alkyl or aryl containing 6 to 30 carbons, n=1 to 6 carbons and $R^2$ contains 1 to 6 carbons.
Where Y is

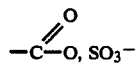
$$-\overset{\overset{O}{\parallel}}{C}-O,\ SO_3^-$$

and also where instead of $CH_2$ there may be substituted $(CH_2CH_2O)_x$ and its derivatives, where x=1 to 20 and includes

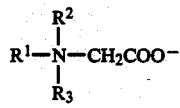

either as mixtures of R' groups or in the presence of cosurfactants, as in paragraph 3a above. The R groups and the composition of the surfactant-cosurfactant mixtures are chosen so as to exhibit a preferential transfer of the surfactants and their solubilized salts into the non-aqueous phase.

The contacting of the aqueous saline solution with the solvent may be carried out in one or more mixing units, in one or more extraction columns, and generally in accordance with known liquid-liquid contacting techniques. If a column or extraction tower is employed, the aqueous saline feedstream would preferably be introduced into the extraction until at a point above that of the introduction of the solvent. The extraction column or tower may be provided with internal means such as contacting trays, packing, rotating discs, contactors, etc., to provide sufficient contacting of the solvent and feed stream to be treated. Again, such technology is well known in the art. The aqueous phase preferably passes through the column countercurrently to the solvent and is withdrawn or recovered from the bottom. The extract phase, containing the extracted salts, passes upwardly through the column countercurrently to the aqueous phase and is removed at the top of the extractor.

In general, the temperatures employed in the extraction step should be such so as to maintain the various components in the liquid phase. Temperatures of from between about 15° to 90° C. may be used with a preferred temperature range being between about 25° to 70° C. However, it should be recognized that the specific temperature used will depend upon the nature of the chargestock, the solvent, etc. In this regard, the ratio of the total solvent, i.e., diluent and surfactant, to the feedstock must be sufficient to form two distinct liquid phases, viz. a raffinate (water) phase containing little if any solvent and an extract phase of solvent containing the salts as the solute. Generally, between about 0.2 to 20 volumes of solvent may be used per volume of the feedstock to be treated. A ratio of from between about 1.2 to 10 constitutes a particularly advantageous and preferred ratio of solvent to feedstream.

In accordance with one process embodiment of the present invention, an aqueous saline media is introduced by way of a conduit into an extraction zone or column. The organic solvent containing the surfactant and diluent is fed from a solvent mixing and/or hold tank and is introduced via a conduit into the extractor at a point below that of the aqueous feedstream so that the two fluids are caused to flow countercurrently to each other. In the extractor, the aqueous media-solvent mixture are intimately mixed and separated into two phases, a heavy phase containing the purified water from which the dissolved salts have been removed and, a lighter phase which contains the solvent and extracted salts. The heavy phase, comprising the fresh water, settles and is withdrawn through a conduit. The lighter extract phase is recovered overhead via another conduit and is charged or passed to a solvent recovery zone. In the recovery zone, the temperature of the solvent/salt mixture is increased by suitable heating means which may be positioned within the recovery zone itself. It should, of course, be understood that the extract phase may be preheated prior to its introduction into the solvent recovery zone as with any suitable heat exchange means. In any event, the increase in temperature, which, as previously discussed should be on the order of about 10° to 30° C., causes a phase inversion and a formation of two distinct phases, a heavier concentrated salt solution and a lighter substantially salt-free solvent solution. The solvent is withdrawn as an overhead product and is then recycled, by way of a conduit, to the extractor. The salt phase is withdrawn through another conduit and is discarded.

In accordance with a further process embodiment, the separation and removal of the salts from the solvent may be effected by the addition of secondary diluents, such as lighter hydrocarbons, alcohols, etc., i.e., propane, isopropyl or isobutyl alcohol, etc., the latter being introduced into the solvent recovery zone. It is believed that the addition of the secondary diluent serves to breakdown and/or dilute the holding capacity of the surfactant and results in the formation, as with the phase inversion, of two distinct phases, i.e., the heavy salt solvent-free phase and the lighter solute-free solvent phase. It should be understood that once the process is fully operational or on stream, with the solvent being continuously recycled to the extractor, only make-up solvent will need to be supplied from the solvent mixing or hold tank. Suitable control and/or metering valves may be employed to regulate the total flow of the solvent being proportionately fed via the recycle and make-up conduits. As will be recognized, the process of the invention is particularly suitable for continuous operation, this being, of course, very significant from the commercial standpoint.

The following examples will serve to further illustrate the present invention, it being specifically intended, however, not to limit it thereto.

EXAMPLE 1

As a specific example of the invention, a pilot plant run was made on an aqueous brine solution containing 1.2% total halogen content calculated as NaCl. The aqueous solution was introduced into the middle portion of a small isothermal extraction column with a solvent having a composition of 94 parts by weight kerosene and 6 parts by weight dioctyl sulfo succinate being introduced near the bottom of the column. The operating conditions in the extraction column were maintained at a temperature of 48° C. and a pressure of 22 psig. Two immiscible phases, comprising a heavy water phase and a lighter extract phase, were formed. The extract phase was removed from the top of the column with the water phase being removed from the bottom. The water phase analyzed 0.1 weight percent total halogen calculated as NaCl. The extract was introduced into a small solvent recovery column and was heated to a temperature of 65° C. resulting in a phase inversion and the formation of a heavy concentrated salt solution and a lighter salt-free solvent phase. The solvent was recovered and recycled to the extraction column. The halogen content of the recovered solvent was 0.02% calculated as NaCl. The heavy concentrated salt phase was removed from the recovery zone and discarded. The results of this example strikingly illustrates the effectiveness of reducing the salt concentration of an aqueous brine solution and the uniqueness in recovering the solvent from the extracted salt.

EXAMPLE 2

The general procedure of Example 1 was repeated except that further diluents were substituted for the kerosene of Example 1. The diluents employed were: FCC gasoline, isobutyl, alcohol, light catalytic naphthas, isobutane, hexane, naphthalene, acetone, butyl chloride and benzene. The results of these tests were substantially the same as that of Example 1.

EXAMPLE 3

The general procedure of Example 1 was repeated except that brine solutions of varying salt concentrations were substituted for that of Example 1. Solutions tested in these experiments had concentrations (weight percent total halogen content calculated as NaCl) of 0.5%, 1.0%; 2.0%; 3.0%; 3.5%; 4.0%; 10% and 20%. The results of these tests were substantially the same as Example 1.

EXAMPLE 4

The general procedure of Example 1 was repeated except that varying surfactants were substituted for the surfactant used in Example 1. The surfactants tested in these experiments were lecithin; sodium lauryl sulfate; ammonium lauryl sulfate; sodium cetyl stearyl sulfate; sulfobetaine, with $R'=C_{12'}$, $n=2$ and $Y=SO_3^-$; dimethyldistearylammonium chloride; dimethyldilaurylammonium chloride; acetyldimethyldodecylammonium chloride; and polyoxyethyleneated oleyl alcohol containing 10 moles of ethylene oxide. The results of these tests were substantially the same as Example 1. In further tests the percentages of the surfactant relative to the diluent were varied between the limits or ranges of from 3 to 15% surfactant-97 to 85% diluent. These reslts were also substantially the same as in Example 1.

EXAMPLE 5

In this example a secondary diluent, i.e., isopropyl alcohol, was introduced into the solvent recovery zone or column. In this experiment the extract was not heated but was maintained at the temperature (48° C.) employed in the extraction zone. It was found that two distinct phases were formed with the heavy phase comprising the salt solution. Analysis of the solvent disclosed a halogen content of 0.5% walculated as NaCl. In a further test the above procedure was repeated except that the extract was heated to 65° C. It was found that this combination was effective to reduce the total halogen content of the solvent extract to 0.01%. In still further tests, the general procedures of Example 1 were again repeated except that calcite, gypsum, iron oxides and calcium sulfate were added to the feedstream in order to simulate a barren solution obtained in in situ mining operations. The results of this test established that the added impurities did not substantially effect the extraction procedure of the invention and that same count effectively extract salts from solutions containing such contaminants.

What is claimed is:

1. A process for reducing salt content of an aqueous saline solution comprising contacting said aqueous saline solution with a selective solvent composed of a water-insoluble organic diluent effective to facilitate phase formation wherein said diluent is selected from the group consisting of kerosenes, gasolines, naphthas, light hydrocarbons, alcohols, ketones, ethers or halogenated derivatives thereof and a surfactant, comprising a material which forms micelles in both aqueous salt solutions and non-aqueous media which in aqueous salt environments become more soluble upon addition of multivalent ions, or a multi-component surfactant system which includes at least one primary anionic surfactant, effective to result in a preferential transfer of solubilized salts in said aqueous saline solution and said solvent under extraction conditions for a period of time to form two immiscible phases containing a heavy substantially salt free water phase and a lighter extract phase containing concentrated salts dispersed within said solvent, and separating and recovering said two immiscible phases, said process further comprising increasing the temperature of said extract phase containing said concentrated salts and said solvent sufficiently to result in phase inversion and form a heavier concentrated salt solvent free solution phase and a lighter substantially salt-free solvent solution phase and separating the heavier concentrated salt solvent free solution phase from the lighter substantially salt-free solvent solution phase.

2. The process in accordance with claim 1 wherein said aqueous saline solution is selected from the group consisting of sea water, brackish waters and industrial process streams.

3. The process in accordance with claim 1 and further comprising contacting said extract phase with a secondary diluent to form a heavy solvent-free salt phase and a substantially salt-free solvent phase.

4. A process for extracting salts from an aqueous saline solution comprising the steps of introducing said aqueous saline solution into an extraction zone; contacting said aqueous saline solution within said zone with a solvent comprising a surfactant dispersed within a water-insoluble organic diluent, wherein said diluent is selected from the group consisting of kerosenes, gasolines, naphthas, light hydrocarbons, alcohols, ketones, ethers or halogenated derivatives thereof, said surfactant being effective upon contact between said aqueous solution and said solvent of causing a preferential transfer of solubilized salts in said aqueous saline solution into a non-aqueous phase formed by said solvent; maintaining said aqueous saline solution and said solvent within said extraction zone under extraction conditions for a period of time sufficient to form two immiscible phases, a light extract phase comprising predominantly said solvent and concentrated salts dispersed within said solvent and a heavy salt-free water phase; and removing said extract and said heavy water phases from said extraction zone, said process further comprising increasing the temperature of said extract phase containing said concentrated salts and said solvent sufficiently to result in phase inversion and form a heavier concentrated salt solvent free solution phase and a lighter substantially salt-free solvent solution phase and separating the heavier concentrated salt solvent free solution phase from the lighter substantially salt-free solvent solution phase.

5. The process in accordance with claim 4 wherein said surfactant is selected from the group consisting of anionic and non-ionic surfactants.

6. The process in accordance with claim 5 wherein said surfactant is an anionic surfactant which comprises an alkyl aryl sulfate or sulfonate.

7. The process in accordance with claim 4 wherein said aqueous saline solution comprises an aqueous salt containing process stream employed in in situ mining or leaching operations.

8. The process in accordance with claim 5 wherein said surfactant is an anionic surfactant which comprises an alkyl sulfate or sulfonate.

9. The process in accordance with claim 4 wherein said extracting within said extraction zone is conducted at a temperature of from between about 15° to 90° C. and at a pressure of above about 1 atm.

10. The process in accordance with claim 9 and further comprising increasing the temperature of said extract phase removed from said extraction zone by about 10° to 30° C. above that temperature which is maintained in the extraction zone.

11. The process in accordance with claim 9 and further comprising contacting said extract phase with a secondary diluent selected from the group consisting of low molecular weight hydrocarbons, alcohols, ketones and ethers.

12. The process in accordance with claim 4 wherein said surfactant comprises dioctyl sulfo succinate.

13. The process in accordance with claim 4 wherein said aqueous saline solution is selected from the group consisting of sea and ground waters.

* * * * *